United States Patent [19]

Reid

[11] 4,101,140
[45] Jul. 18, 1978

[54] PERIPHERALLY GROOVED SEAL

[75] Inventor: William P. Reid, Long Beach, Calif.

[73] Assignee: Tetrafluor, Inc., El Segundo, Calif.

[21] Appl. No.: 523,164

[22] Filed: Nov. 12, 1974

Related U.S. Application Data

[63] Continuation of Ser. No. 237,443, Mar. 23, 1972, abandoned, which is a continuation of Ser. No. 13,630, Feb. 24, 1970, abandoned.

[51] Int. Cl.$^2$ .............................................. F16J 9/06
[52] U.S. Cl. ...................................... 277/165; 277/208
[58] Field of Search ........................ 277/165, 208, 209

[56] References Cited

U.S. PATENT DOCUMENTS

| | | | |
|---|---|---|---|
| 2,287,884 | 6/1942 | Jominy | 277/214 X |
| 2,356,947 | 8/1944 | Pranger et al. | 277/213 X |
| 2,606,086 | 8/1952 | Rappl | 277/208 |
| 2,841,422 | 7/1958 | Badger | 277/207 X |
| 2,968,501 | 1/1961 | Tisch | 277/177 |
| 3,033,578 | 5/1962 | Kellog | 277/214 X |
| 3,268,235 | 8/1966 | Jacobellis | 277/165 |
| 3,418,001 | 12/1968 | Rentschler et al. | 277/177 X |
| 3,427,051 | 2/1969 | White et al. | 277/165 X |
| 3,494,624 | 2/1970 | Woodling | 277/165 |

Primary Examiner—Richard E. Aegerter
Assistant Examiner—L. Footland
Attorney, Agent, or Firm—Edward J. DaRin

[57] ABSTRACT

A composite seal for use between a movable element and a static element in a fluid pressure system where pressures vary on opposite sides of the seal. The seal comprises a fluoronated hydrocarbon sealing ring with a finely grooved sealing surface and an elastomer loading ring. The loading ring is a static seal and normally imposes radial force on the dynamic sealing ring and under increased fluid pressure deforms the peripheral grooves, forcing entrained fluid from them. The sealing ring has recovery characteristics which tend to restore the deformed grooves without readmitting fluid into the grooves, establishing a pressure differential which adheres the sealing ring to the surface to be sealed.

10 Claims, 8 Drawing Figures

U.S. Patent
July 18, 1978
4,101,140
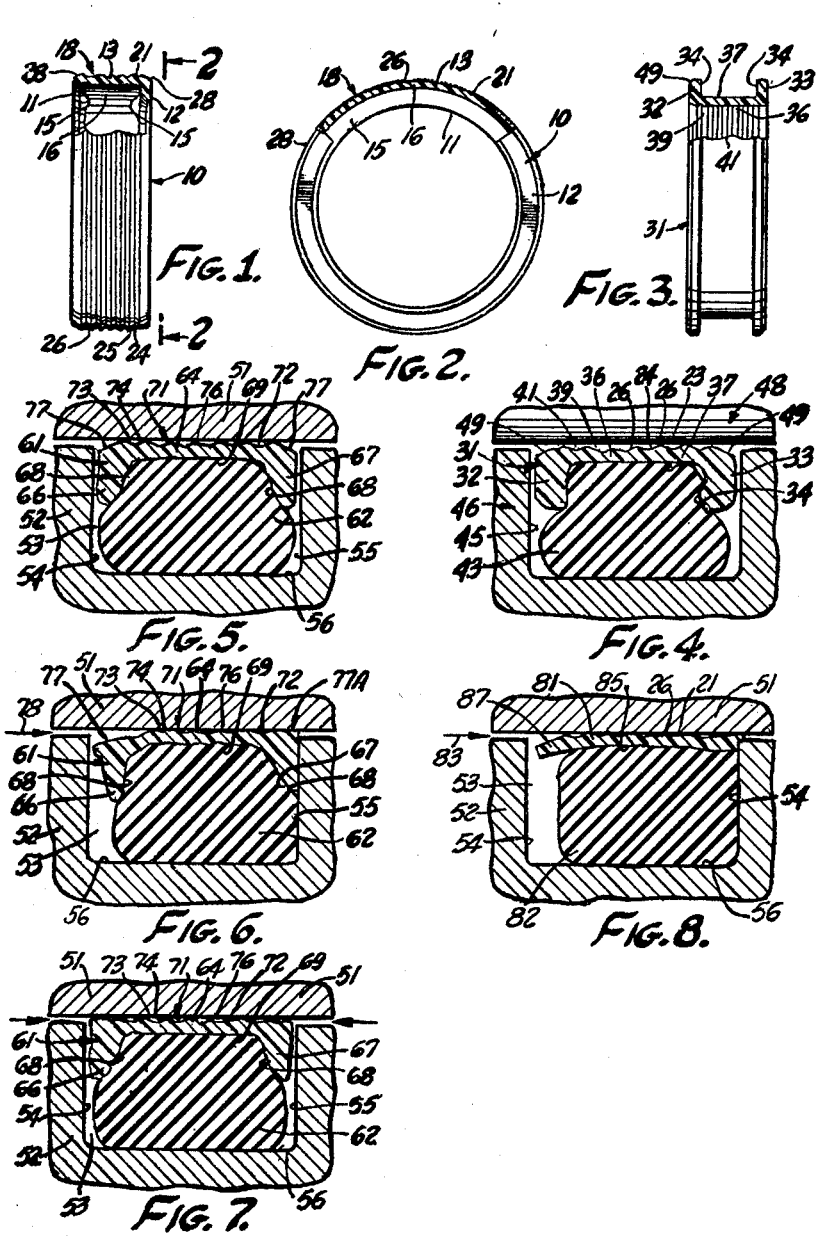

PERIPHERALLY GROOVED SEAL

This is a continuation of of application Ser. No. 237,443 filed Mar. 23, 1972, abandoned, which is a continuation of Ser. No. 13,630, filed Feb. 24, 1970, abandoned.

BACKGROUND OF THE INVENTION

The invention relates to seals between moving members in fluid pressure systems wherein the fluid pressure varies on opposite sides of the seal. An effective seal often depends not only upon the configuration of the sealing members, but upon their frictional relationship to the other system components. It is known, for instance, to compose a seal of a relatively rigid member having low friction characteristics with a backup or loading static seal member of greater elasticity but with undesirable friction characteristics. However, there has been a problem with such composite seals in failure of the seal during certain conditions of fluid pressure change. The failures have been intermittent and unpredictable and it is not fully understood why they occur, but it is believed that a minute retraction of the dynamic seal from the sealing surface takes place when a fluid pressure change, either to a low pressure condition or to a balanced pressure condition, occurs even momentarily. The retraction from the sealing surface, even though incomplete, is believed to establish a fluid path between the sealed surface and the sealing ring with consequent undesirable affects.

SUMMARY OF THE INVENTION

In order to solve the apparent problem with composite seals, it is necessary to establish a movable bond between the sealing ring and the surface to be sealed. The invention, therefore, contemplates a seal between a movable element and a static element in a fluid pressure system with varying fluid pressures on opposite sides of the sealing means which comprises a dynamic sealing ring of fluoronated hydrocarbon with a plurality of annular grooves defining a sealing surface, and a static loading ring having resilient characteristics which imposes a general radial force on the sealing ring in response to increased fluid pressure. The annular grooves are so conformed that the radial force tends to deform them and force entrained fluid out of the grooves. The sealing ring has shape recovery characteristics which tend to redefine the grooves when the radial pressure decreases, without re-entraining the fluid which was forced out. The re-established groove volume has a reduced pressure compared to the surrounding pressures and, therefore, the sealing ring tends to adhere to the adjacent surface.

The sealing ring is preferably of fluoronated hydrocarbon such as polytetrafluoroethylene, commonly referred to as "TFE", with a 5% elastic factor. The material is available under various trade names such as Teflon, Fluon, and Halon. Chlorinated fluorocarbons are also adapted to the instant use.

The static loading ring may be either toroidal in configuration, or of a square cross section, and is preferably of an elastomer material such as that commonly used for O-rings. The loading ring may impose upon the sealing ring either internally or externally.

The sealing ring may have radial flanges which act as anti-extrusion barriers for the loading ring.

An object of the invention is to provide a sealing means between relatively movable members which has low sliding friction.

Another object is to provide sealing means wherein intermittent sealing failure is avoided by a composite seal which adheres to the surface to be sealed despite changing fluid pressures.

A further object is to provide a composite seal having a low friction dynamic member to reduce sliding friction and a radially deformable member to provide a static seal between the various elements of the apparatus.

The sealing means of the invention readily adapts to present fluid pressure systems wherein one of the relatively movable members has a groove for seals and lends itself to easy assembly and effective sealing over a wide range of pressures and temperatures.

These and other objects of the invention are apparent from the following detailed description and drawing wherein like reference characters are used for like elements.

BRIEF DESCRIPTION OF THE DRAWING

FIG. 1 is an elevational view partly in section, of a preferred sealing ring of the invention;

FIG. 2 is an elevational view partly in section and taken along line 2—2 of FIG. 1;

FIG. 3 is a side elevation partly in section of an alternate sealing ring of the invention;

FIG. 4 is a fragmentary sectional view of a further alternate embodiment of the invention;

FIG. 5 is a fragmentary sectional elevation of a sealing member in place under no pressure conditions;

FIG. 6 is a view similar to FIG. 5 with the sealing member exposed to an imbalance of pressures;

FIG. 7 is a fragmentary sectional elevation with the seal of FIG. 5 subjected to a balance of pressures; and FIG. 8 is a fragmentary sectional elevation illustrating a still further alternate embodiment of the invention.

DESCRIPTION OF THE PREFERRED EMBODIMENTS

FIGS. 1 and 2 illustrate a dynamic sealing element in accordance with the invention wherein a flanged sealing ring 10 has internally projecting transversely spaced radial flanges 11 and 12 connected by a web 13. Each flange has a radial inner wall 15. A smooth cylindrical inner web wall 16 is adapted to make a static seal with a complementary elastomer loading ring (not shown).

Web 13 has a sealing surface 18 composed of a plurality of relatively shallow annular grooves 21 which are transversely spaced on the sealing surface 18. Each groove is defined by a pair of diverging walls 23, 24. Each diverging wall of a groove intersects the diverging wall of the adjacent groove to define an annular land 26, with the exception of the two outermost grooves. The lands 26 make contact with the surface to be sealed when the sealing ring is assembled in a fluid pressure system. Preferably, the sealing ring is of a fluoronated hydrocarbon such as "TFE" but may be of other materials having like characteristics. Each ring is chamfered at its outer corner in a sloping wall 28 to prevent abrasion of the ring at assembly. The annular grooves are preferably roll-formed on a dimensionally complete ring so that the lands thus formed are not exposed to damage through further manufacturing procedures.

The dynamic sealing ring of FIGS. 1 and 2 is adapted for use in a seal wherein the groove seating the sealing members is in the periphery of the innermost of the relatively moving elements of the fluid pressure system. The dynamic sealing ring 31 shown in FIG. 3 is adapted to use in the groove seating the members in the outermost of two relatively movable elements. The complementary elastomer loading ring (not shown) of the sealing ring of FIG. 3 surrounds the ring and transmits radial pressures inwardly.

The sealing ring 31 of FIG. 3 has transversely spaced, outwardly extending radial flanges 32 and 33 having substantially radial inner walls 34. The flanges are connected by a transverse web 36 which has a smooth outer wall 37 adapted to establish a static seal with a loading ring. An inner sealing surface 39 has a plurality of shallow annular grooves 41 substantially similar to the grooves 21 described in conjunction with the embodiment of FIGS. 1 and 2.

In FIG. 4 the sealing ring 31 is shown combined with an elastomer static loading ring 43 both seated in an annular groove 45 of a fluid pressure system outer member 46. The lands 26 defined by the convergence of diverging groove walls 23, 24 of adjacent grooves impinge upon the periphery of a fragmentarily shown inner member 48 such as a piston rod. The sealing members, flanged sealing ring 31 and toroidal loading ring 43 are assembled into the groove 45 under compression such that the loading ring is deformed and therefore exerts some radial force against the smooth sealing surface 37 of the sealing ring. This radial thrust upon the dynamic sealing ring is increased by fluid pressure upon the loading ring and insures contact between the inner member 48 and the sealing surface 39 of the sealing ring.

The illustrative sectional view of FIG. 4 shows the components of a composite seal as installed in a fluid system and prior to fluid pressurization. The outer edges of the flanges 32, 33 have chamfers 49 to aid assembly. After assembly, the fit between the piston rod periphery and the lands 26 of the sealing ring is such that the inner diameter of the lands is the same as or slightly less than the outer diameter of the rod. Therefore, any fluid pressure causing distortion of the loading ring 43 results in a radial thrust against the sealing ring, establishing sealing contact between the several lands of the sealing ring and the rod periphery.

Preferably, the grooves of the sealing surface of the sealing ring are formed by a rolling process after the sealing ring is dimensionally complete. It has been found that grooves in TFE materials which are approximately 0.020 inch wide and 0.002 inch to 0.004 inch deep achieve an effective seal. With grooves of such dimensions the angle of divergence of the groove walls varies between 134° and 156°. The depth of the groove is determined in part by the radial thickness of the sealing ring wall.

FIGS. 5-7 illustrate under different pressure conditions the differing configurations of a composite seal within a cylinder 51 and sealing between the relatively movable cylinder and a piston 52. The piston has a groove 53 defined by parallel spaced walls 54, 55 and a cylindrical wall 56. While the walls 54, 55 have been shown as parallel, they may diverge outwardly from 0° to 5° in accordance with industrial practices. Ordinarily, the seal is better effected if there is little or no divergence. Within the groove are a TFE sealing ring 61 and a normally toroidal loading ring 62 of an elastomer material. The sealing ring comprises a band 64 having spaced radial flanges 66, 67 integral with the band. Each flange has a sloping inner wall 68, the walls 68 being connected by a smooth static sealing annulus 69.

The sealing ring has an outer dynamic sealing surface 71 comprised of a plurality of shallow grooves 72 proportioned like those of FIG. 4. Each groove is defined by annular diverging walls 73, 74. The walls converge with the diverging walls of adjacent grooves to define sealing lands 76. The sealing surface 71 terminates at its edges in chamfers 77.

As in the previously described embodiment, the composite seal is assembled into the groove under compression such that a radial thrust is imposed upon the sealing ring by the loading ring. As illustrated in FIG. 6, when fluid pressure is applied, with higher pressure from the direction indicated by arrow 78, the elastomer loading ring 62 is thrust against the groove wall 55 and its shape further distorted such that resultant forces also displace the sealing ring from left to right in the figure and slightly deform it. The sealing ring deformation causes the sealing grooves to become shallower, thus smaller in volume, with a resultant migration of fluids from the grooves toward the low pressure side of the seal. If the fluid pressure is relatively high, as in the range above 1500 p.s.i., the low pressure flange, in this case flange 67, is compressed such that the chamfered ring edge 77A is in substantial contact with the cylinder bore. Some bowing of the ring may also take place. The bowing results in a radially inward deformation of the flange 66 on the high pressure side of the seal.

It is believed that the configuration of the sealing ring imparts the bowed deformed shape in that the band 64 of the ring varies in thickness transversely. While the preferred TFE material has an elasticity factor of approximately 5%, the apparent change in shape due to the radial thrust of the loading ring cannot be attributed entirely to the elasticity. Therefore, the varying band thickness is believed to be a factor in the effective seal achieved by the composite seal of the invention.

Under extreme pressures the sealing annulus 69 of the sealing ring may even deform as shown in FIG. 6 as the band tends towards uniform thickness under the deforming pressure.

The fluids displaced from the deformed grooves may be gases trapped on assembly, or lubricants used in assembly. There is also a possibility that some or all of the grooves may contain the pressurizing fluid of the system.

Due to the slightly bowed configuration on at least the high pressure side of the seal, not all of the lands make sealing contact all the time. However, at least 60% of the transverse sealing ring dimension has been determined to effect a positive dynamic seal between the sealing ring and the adjacent surface. A positive static seal is also effected between the loading ring and the inner surface of the sealing ring, particularly since the elastomer is itself very effective as a static seal.

Under conditions like those of FIG. 6 where an imbalance of pressures exists, there is a tendency in conventional seals for the elastomer to extrude into the clearance gap between the inner and outer members of the fluid system being sealed. The radial flanges of the embodiments of FIG. 3 and FIG. 5 are effective as non-extrusion backup rings to prevent such elastomer extrusion with consequent deterioration of the elastomer. Any extrusion into the clearance gap of the dynamic sealing ring, with its low friction characteristics, however, is not critical since the characteristic of low friction prevents the abrading and "nibble" which deteriorates elastomer seals.

In FIG. 7 the sealing ring 61 and the loading ring 62 are shown as exposed to pressure from both sides of the seal. The pressure may be in either the high or the low range but is in balance. It is under these conditions in a fluid system that it is believed intermittent failures of conventional composite seals occur. The TFE sealing ring conventionally used may at this stage exhibit radial retraction tendencies, causing it to withdraw minutely from the adjacent surface of the cylinder 51, establishing a leak path. It is known that the radial thrust is less under pressure balanced conditions since the loading ring is subject to less distortion and tends to recover to its normal configuration.

The composite seal of the invention prevents such withdrawal. When the radial pressure on the sealing ring lessens under balanced pressure conditions, the grooves tend to recover their normal configuration and volume. However, since they now contain a lesser fluid volume, a partial vacuum condition or a pressure differential is believed to be established between the grooves and the surrounding fluid pressures. The sealing ring therefore adheres to the cylinder wall and maintains a seal which is effective against subsequent sudden changes in pressure balance which may cause the intermittent blow-by suffered by conventional TFE seal assemblies. As can be seen in FIG. 7, the sealing ring is deformed under balanced pressure conditions such that the bowed configuration shown in FIG. 6 no longer pertains. The seal is also restored to its central position with respect to the groove but the radial flanges still preclude extrusion of the elastomer loading ring.

The shallow grooves in the dimensional range set forth with respect to the embodiment of FIGS. 3 and 4 are believed to be effective to establish adherence because there is a lesser tendency for the material to flow and fill the grooves than when the grooves have conventional opposite parallel walls. Additionally, the lands are narrow and may thus more easily accommodate to slight variations in the surface to be sealed than do wider lands.

In FIG. 8 an alternate embodiment of the invention is shown in which a cylinder 51 surrounds a piston 52 which is movable relative to the cylinder. The piston has a groove 53 with spaced substantially parallel walls 54, 55 which, together with an annular wall 56, define the groove. The groove contains a composite seal comprised of a sealing ring 81 of a low friction material such as tetrafluoroethylene and a loading ring 82 of an elastomer material like conventional O-rings. In the embodiment of FIG. 8, the loading ring 82 has a square cross section prior to assembly in the groove. The sealing ring 81 has a plurality of shallow grooves 21 similar to the grooves described with respect to the other embodiments. The lands 26 define a sealing surface on the sealing ring.

The embodiment of FIG. 8 is shown as exposed to an imbalance of pressure wherein the high pressure side is the left side of the view, as indicated by arrow 83. The loading ring is therefore thrust transversely against piston groove wall 54 and distorted with a radial resultant force impinging upon the static sealing surface 85 of the sealing ring. The high pressure side of the sealing ring tends to bow inwardly at 87 such that not all of the sealing ring of the ring effects contact with the cylinder wall. The sealing ring distorts under the pressure of the loading ring and effectively closes the clearance gap to extrusion by the loading ring on the low pressure side. As stated above, minor extrusion of the TFE material at the clearance gap does not affect performance of the composite seals since the low friction qualities of the TFE material preclude deterioration of the ring due to abrasion.

The invention adapts to the use of either toroidal elastomer rings or elastomer rings of rectangular cross section. The changes in part depend upon the configuration of the sealing ring taken with the requirement for substantially full volumetric occupancy of the gland groove.

While only a few of the sealing ring configurations have been shown and described in the illustrative embodiment, many variations will occur to those skilled in this particular art, and it is therefore desired that the scope of the invention be measured by the appended claims rather than by the illustrative embodiments.

I claim:

1. As an article of manufacture, a bi-directional sealing ring for use with a cooperative elastomer loading ring for special utility in continuous dynamic operation in opposing fluctuating or pulsating fluid pressure from a low pressure to a relatively high pressure, for example, in a pump or a hydraulic cylinder, said sealing ring being made of plastic material having the general characteristics of a fluorinated hydrocarbon and having inner and outer circumferentially extending sealing surfaces, one of said circumferentially extending sealing surfaces being shaped and dimensioned for sealing contact with the cooperative loading ring for transmission of fluid pressure to the sealing ring through the loading ring, the other of said circumferentially extending sealing surfaces serving to create a dynamic leakproof fluid seal against an adjacent confronting surface when relative axial movement occurs between the sealing ring and the confronting surface in response to said pressure changes applied thereto tending to establish a temporary fluid path between the confronting surface and said other sealing surface, said other of the circumferentially extending sealing surfaces having a multiplicity of circumferentially extending very narrow and very shallow grooves with oppositely sloping outwardly divergent side walls forming circumferentially extending lands with sloping side walls, the degree of divergence of the opposite sloping walls being such that the walls defining the grooves flatten in transverse cross section in response to relatively high pressure pulsations from the loading ring without forming bulges overhanging the grooves whereby the volumes of the grooves contract in response to the high pressure pulsations and subsequently expand with suction effect as the pressure decreases in the time intervals between the high and reduced pressure pulsations with consequent tendency for the sealing ring to maintain effective sealing contact with the confronting surface in the time intervals thereby preventing leakage in the low pressure condition and blow-by when high pressure is again applied, and whereby the pressure pulsations increase the area of the lands that transmit pressure from the loading ring directly to said confronting surface until the lands support the load, there being a plurality of the lands on each side of a median plane of the sealing ring so that bowing of the ring away from said confronting surface on the high pressure side of the median line in response to high pressure leaves a multiplicity of lands in effective sealing contact with said confronting surface on the other side of the median line.

2. A sealing ring as set forth in claim 1 in which the width of the grooves is approximately 1/50 of an inch.

3. A sealing ring as set forth in claim 1 in which at least some of the grooves are contiguous to each other thereby forming lands of inverted V-shape in cross section that spread readily under pressure to increase the rate at which the total area of contact of the lands with the confronting surface increases with rising fluid pressure.

4. A sealing ring as set forth in claim 1 in which all of the successive grooves are contiguous with each other so that all of the lands formed by successive grooves are V-shaped in cross sectional configuration.

5. A sealing ring as set forth in claim 1 in which the depth of the grooves is approximately one-tenth to one-fifth of the width of the grooves for corresponding slope of the side walls of the grooves.

6. A sealing ring as set forth in claim 5 in which the width of the grooves is approximately 1/50 of an inch.

7. A sealing ring as set forth in claim 5 in which the grooves are constructed defined and arranged in one continuous series with the sloping walls of successive grooves meeting to form lands of inverted V-shape cross section.

8. A sealing ring as set forth in claim 7 in which the width of both the grooves and the V-shaped lands is approximately 1/50 of an inch.

9. A sealing ring as defined in claim 1 wherein the circumferentially extending grooves are formed in the sealing ring by a rolling process.

10. A sealing ring as defined in claim 1, wherein the grooves are formed without removing the material from the sealing surface.

* * * * *

UNITED STATES PATENT OFFICE
CERTIFICATE OF CORRECTION

Patent No. 4,101,140           Dated July 18, 1978

Inventor(s) William P. Reid

It is certified that error appears in the above-identified patent and that said Letters Patent are hereby corrected as shown below:

CLAIM 1 - Column 6, lines 36 and 37, the words "leakproof fluid" should be omitted.

Column 6, line 38, the word "when" should read -- where --.

Column 6, lines 39 through 42, the words "in response to said pressure changes applied thereto tending to establish a temporary fluid path between the confronting surface and said other sealing surface" should be omitted.

Signed and Sealed this

Sixth Day of February 1979

[SEAL]

Attest:

RUTH C. MASON
Attesting Officer

DONALD W. BANNER
Commissioner of Patents and Trademarks